United States Patent [19]

Hoyte et al.

[11] 3,754,829

[45] Aug. 28, 1973

[54] METHOD AND MEANS FOR QUANTITATIVE SPECTROGRAPHIC ANALYSIS

[75] Inventors: John M. Hoyte, Menlo Park; Keith E. Hollenbeck, Mountain View, both of Calif.

[73] Assignee: Spectrex Company, Redwood City, Calif.

[22] Filed: Aug. 19, 1971

[21] Appl. No.: 173,078

[52] U.S. Cl. .................... 356/76, 356/77, 356/79, 356/86
[51] Int. Cl. ........................ G01j 3/06, G01j 3/18
[58] Field of Search ................ 356/74, 76–79, 356/85, 86, 87

[56] References Cited
UNITED STATES PATENTS
2,751,811  6/1956  Vreeland .......................... 356/86
2,980,798  4/1961  Romand et al. .................. 356/86 X FOREIGN PATENTS OR APPLICATIONS
898,047  6/1962  Great Britain ..................... 356/77

OTHER PUBLICATIONS

O'Bryan, Journal of the Optical Society of America, Vol. 22, December 1932, pages 739-748.

Gabriel et al., Journal of Scientific Instruments, Vol. 40, 1963, pages 10-13.

Primary Examiner—David Schonberg
Assistant Examiner—F. L. Evans
Attorney—A. C. Smith

[57] ABSTRACT

The spectral lines associated with a sample of material under examination are deflected from their normal optical path by an angle which varies logarithmically with time toward a sheet of photographic film. The film is thereby exposed to provide a photographic image of the spectral lines which taper in intensity toward nonexposure, and the length of the line or lines is thus representative of the concentration of an element present in the sample under examination.

10 Claims, 2 Drawing Figures

INVENTORS
JOHN M. HOYTE
KEITH E. HOLLENBECK

BY  A. C. Smith

ATTORNEY

METHOD AND MEANS FOR QUANTITATIVE SPECTROGRAPHIC ANALYSIS

BACKGROUND OF THE INVENTION

The intensity of a spectral line in the spectrum of a mixture of elements is commonly accepted, in accordance with the quantum theory of light, to be directly proportional to the concentration of the selected element in the mixture. Certain known spectrographic analysis techniques rely on this relationship in detecting the intensity of a spectral line to provide an indication of the concentration of the selected element within a sample under examination. The intensity of a spectral line may be measured by recording the line on photographic film under conditions of time-varying exposure of portions of the film so that the photographic image of the spectral line diminishes in intensity with length on the surface of the film.

These prior art techniques have been used extensively in conventional devices which also regulate the current in the arc that burns the sample in order to provide more uniform spectral intensity. Further, a rotating disc is commonly placed in front of the slit. The radius of the disc varies logarithmically with circumference and is inevitably large and cumbersome. Thus, conventional devices of this type commonly require elaborate optical mechanisms in order to produce spectral lines of sufficiently high dispersion and adequate length of slit to attain reasonable resolution in the intensity variations with length of the photographic recordings made from such spectral lines.

SUMMARY OF THE INVENTION

In accordance with the illustrated embodiment of the present invention, spectral lines are recorded on photographic film with lengthwise variations in intensity produced by deflecting the spectral lines at an angle which varies as a function of time. In this way, simple spectrooptical mechanisms yielding only marginal-size spectrograms normally suitable for qualitative analysis may be modified to yield photographic displays of large dimension and magnified line elongation suitable for quantitative analysis. The spectral lines which emerge, say, from the eyepiece of a simple qualitative spectrograph are deflected onto a photographic plate or film by a mirror which rotates through an angle that varies logarithmically with time. The resulting photographic record (a spectrogram herein) comprises spectral lines which diminish in intensity with length toward nonexposure, thereby yielding a spectrogram of large dimensions for improved resolution of the intensity variations of the recorded spectral lines.

DESCRIPTION OF THE PREFERRED EMBODIMENT

Figure 1:
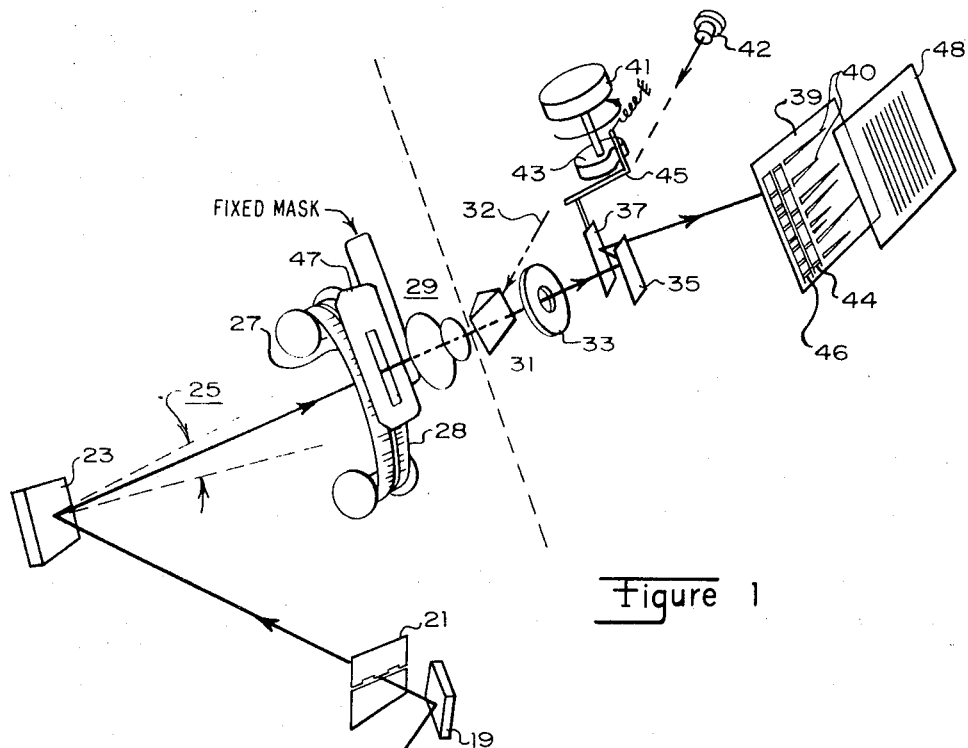
FIG. 1 is a pictorial diagram of the spectrographic analysis apparatus of the present invention.

Referring now to FIG. 1, there is shown a pictorial diagram of the spectrographic analysis apparatus of the present invention. The apparatus includes a pair of electrodes 9, 11 one of which serves as the receptacle for the sample of material under examination. A regulated supply of current 13 is connected to the electrodes to establish an arc between the standard electrode 9 and the electrode containing the sample 11. The radiation from the arc passes through a contraster adjustment 15 which prevents the white light from the electrode tips from passing through the optical system and which thus increases spectral line contrast. The radiation then passes through collimating lens 17 to the reflecting surface of a mirror 19 from whence the radiation is reflected through an aperture or slit 21 to a diffraction grating 23. The diffraction grating 23 disperses light to form a spectrum of the radiation which is representative of the elements present in the sample under examination. The spectral lines are distributed over an angle 25 which is determined by the wavelengths of the constituent radiation from the sample under examination. This radiation is projected in close proximity to master films 27, 28 which include spectrograms for the major elements of the Periodic Table. In this way, the spectrum produced by the sample under examination can be compared directly with portions of the standard films which most closely match the spectrum of the sample under examination. The spectrum of the sample under examination may thus be viewed through an eyepiece lens system 29 and compared directly with the representative spectrograms on the master films 27, 28. Spectrographic apparatus of this type is described in the literature (see, for example, U.S. Pat. No. 2,751,811 issued on June 26, 1956 to F. K. Vreeland).

Figure 2:
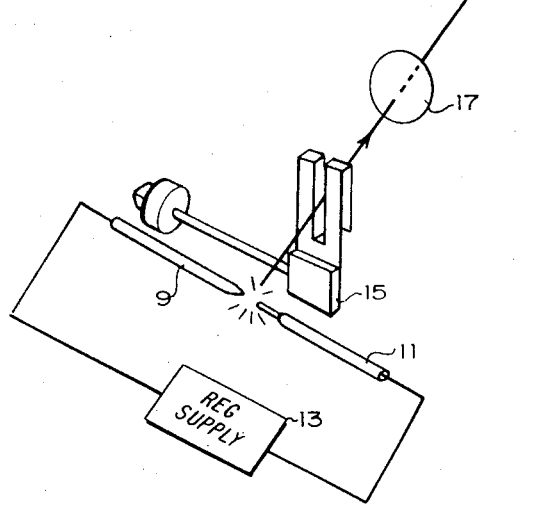
FIG. 2 is a photographic presentation of the spectral lines of a sample prepared in accordance with the apparatus of FIG. 1.
Figure 2:
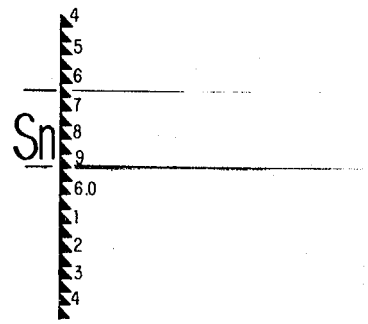

Conventional apparatus for spectrographic analysis of this type is ideally suited for quick, portable determination of the qualitative constituents of the sample under examination. In order to determine the quantitative content of the sample under examination the additional apparatus disposed beyond the eye lens system 29 is used to provide a photographic indication of the concentration of elements contained in the sample under examination. The quantitative analyzer includes a split prism 31 for viewing through an auxiliary optical axis 32 while the quantitative attachment is in place. The spectrum of the sample under examination may thus be viewed by the operator and simultaneously photographed for presentation of the quantitative information. The mean optical path taken by the light thus passes through the split prism 31 and also passes through shutter 33 to a fixed mirror 35 that is disposed substantially normally to the mean optical path. The spectrum is then reflected from the fixed mirror 35 to a rotatable mirror 37 from whence it is reflected to the photographic film 39. The rotatable mirror 37 is coupled to a drive motor 41 which rotates a cam 43 that has a periphery which is logarithmically curved as a function of angular rotation. The cam follower arm 45 connected to the rotatable mirror 37 and resiliently biased against cam 43 thus causes the mirror to rotate through an angle which varies as a logarithmic function of time. All but a narrow sector of the spectral lines may be masked out using the slide mask 47 which includes a slit that is oriented transversely to the spectral lines, and this narrow sector of spectral lines is thus deflected over the width of the photographic film 39 as a logarithmic function of time. The logarithmic deflection of the portion of the spectrum produces a varying degree of exposure across the width of the photographic film 39. As a result, the spectral lines are tapered in intensity on the photographic film after development and appear as tapered lines 40 having lengths which are proportional to the percentage of the spectral element present in the sample under examination. (The images produced on the photographic film 39 are shown in FIG. 1 as viewed from the reverse side for purposes of clarity, and are shown in FIG. 2.)

The cam follower arm 45 may also be actuated by push-button 42 to be manually positioned away from the cam surface 43, thereby to deflect a portion of the spectrum to the extreme left edge of the photographic film 39, as shown. This provides a photographic image of the spectrum 44 of the sample under examination and also provides a photographic image 46 of a selected portion of the master films 27, 28. Simultaneously with this action, the mask 47 may be moved over the left- or right-hand master films 27, 28 which can be set to show the elements present that match the spectrum being produced by the sample under examination. The photographic record of the spectrum produced in this way thus contains both the qualitative and quantitative information about the constituents present in the sample under examination, as shown in FIG. 2.

In order to enhance the accuracy of the quantitative indication provided by the tapered lines 40 produced on the photographic film 39 in accordance with the present invention, a selected element of known concentration and having a readily distinguishable spectrum may be burned in the arc between electrodes 9 and 11 simultaneously with the elements of unknown quantities present in the sample under examination. This known element of known concentration thus produces a characteristic line of designated length on the photographic film 39 that serves as a reference for determination of the quantity of the unknown elements present in the sample under examination. For convenience, the photographic film 39 may provide a direct positive such as is produced by the Polaroid process. The photographic presentation thus includes a plurality of spectral lines 40 having varying lengths which taper in decreasing intensity to a condition of nonexposure at the end of the tapered length, as shown in FIG. 2. It should be noted that the lengths of the spectral lines 40 are greatly extended from the lengths visible through the eye lens system. This is due to the movement of the rotatable mirror 37 of FIG. 1 which thus contributes to the quantitative resolution of the photographic presentation 39. The rotatable motion of the mirror 37 thus obviates the need for the conventional spectrographic analysis apparatus which commonly uses a field of view parallel to the spectral lines that is as wide as the required photographic presentation in order to make the quantitative analysis by logarithmic exposure of photographic film. Also, the rotatable motion of the mirror 37 may be repeated several times during one shutter opening. In this way successive experimentation on the number of repeated movements of the rotatable mirror per shutter opening will yield a photographic presentation with the spectral lines 40 properly terminating within the field of view of the photographic film.

In order to determine the precise termination of the spectral lines of decreasing intensity on the photographic film, a filter 48 may be laid over the film to enhance the photographic image of the spectral lines. This filter, incorporating discrete graduations of increasing density, is superimposed over the film oriented with the increasing density disposed along the length of a spectral line as it decreases in image intensity. The filter 48 thus aids in locating with great precision the ends of the tapered spectral lines associated with the known quantity of the known element present and the ends of the spectral lines associated with the elements of unknown quantity. Once the lengths of the spectral lines of both the reference element of known quantity and the spectral lines of the elements of unknown quantities are determined, the concentration of the unknown element in the sample under examination may be determined by standard methods as reported in the literature (see, for example, "Spectrochemical Procedures" by C. Harvey, Applied Research Laboratory, 1950).

We claim:

1. Spectrographic apparatus comprising:

spectral source means for forming the characteristic spectrum of an element contained in a sample under examination, the spectrum including at least one spectral line projected along an optical path of selected orientation;

a reflector positioned along the optical path to receive the spectrum projected therealong and disposed to rotate over a selected range of angular positions about an axis substantially normal to said selected orientation of the optical path and at an angular velocity which varies nonlinearly as a function of the time to rotate over said selected range; and a radiation-receiving output screen having a surface for receiving at least a portion of the spectrum thereon as reflected from said reflector for positions thereof about said rotational axis within said selected range of angular positions to produce on said screen an output indication of said portion of the spectrum as at least one elongated spectral line which varies in intensity along the length thereof.

2. Spectrographic apparatus as in claim 1 comprising:

a record of standard spectrograms of selected elements disposed adjacent the optical path for simultaneously comparing the standard spectrum of a selected element with the spectrum projected along said optical axis of an element contained in the sample under examination;

light means for illuminating said record or standard spectrograms; and means for selectively rotating said reflector about the rotational axis thereof over said selected range to project the illuminated record of standard spectrograms onto a portion of the area of said radiation-receiving output screen which is outside the portion of area of the output screen that receives the spectrum of the sample under examination reflected from said reflector for angular positions thereof within said selected range.

3. Spectrographic apparatus as in claim 1 comprising actuating means coupled to rotate said reflector at an angular velocity which varies logarithmically as a function of time over said selected range of angular positions.

4. Spectrographic apparatus as in claim 3 wherein:

said output screen includes actinically sensitive means; and said actuating means repetitively rotates said reflector through the selected range of angular positions to expose the actinically sensitive means to the reflected spectrum for producing an output indication of the reflected spectrum including at least one elongated exposure which corresponds to a spectral line and which varies in intensity of exposure contrast over the length thereof substantially to zero exposure contrast at an end thereof.

5. Spectrographic apparatus as in claim 4 comprising:
a fixed reflector spaced away from the rotatable reflector and disposed along the optical projection path of a spectrum for reflecting the spectrum toward said rotatable reflector; and
shutter means interposed along said optical projection path of a spectrum between said spectral source means and the rotatable reflector for selectively blocking projection therethrough of a spectrum after a selected plural number of repetitions of the rotation of said reflector over said selected range.

6. Spectrographic apparatus as in claim 4 comprising masking means interposed along said optical projection path of a spectrum between said spectral source means and said rotatable reflector for transmitting therethrough to said rotatable reflector only a selected portion of the length of the spectral lines of a spectrum.

7. A quantitative spectral analyzer comprising:
an optical input port having an optical axis therethrough for receiving at least a portion of spectrum projected along an axis aligned with said optical axis;
a reflector disposed along the optical axis through said input port for reflecting a received spectrum along an auxiliary optical axis in skew relationship to the optical axis through the input port;
a photographically-sensitive screen;
a rotatable reflector disposed along the auxiliary optical axis;
actuator means coupled to rotate said reflector over a range of angular positions as a nonlinear function of the time to rotate over said range for selectively reflecting the auxiliary optical axis over a corresponding range of positions on said screen; and
shutter means interposed along said optical axis through the input port between said reflector and said input port for selectively blocking the optical path along said optical axis through the input port after a selected number of repetitions of the rotation of said rotatable reflector over said range of angular positions.

8. A quantitative spectral analyzer as in claim 7 wherein said actuator means is capable of rotating the rotatable reflector over said selected range a plural number of repetitions during the period said optical path is unblocked by said shutter means and at an angular velocity in each repetition which varies as a logarithmic function of time.

9. Method of quantitatively analyzing the spectrogram of a sample under examination, the method comprising the steps of:
projecting along an optical axia a selected portion of spectral lines of the sample under examination; and
deflecting the optical projection axis onto an actinically sensitive surface at a deflection angle which varies substantially as a logarithmic function of time.

10. Method of quantitatively analyzing the spectrum of a sample under examination in accordance with claim 10 wherein in the step of deflecting the optical projection axis, the actinically sensitive surface is exposed to said portion of spectral lines projected along said optical axis a plurality of occurrences, and for each occurrence said portion of spectral lines projected along said optical axis is deflected onto said actinically sensitive surface over substantially the same deflection angle and at substantially the same logarithmic variation thereof as a function of time to produce an output indication which is indicative of the accumulated exposure of said actinically sensitive surface to said plurality of occurrences of projected spectral line deflections.

* * * * *